US008064965B2

(12) United States Patent
Ozaki

(10) Patent No.: US 8,064,965 B2
(45) Date of Patent: Nov. 22, 2011

(54) IN-VEHICLE APPARATUS

(75) Inventor: Takahisa Ozaki, Gamagori (JP)

(73) Assignee: Denso Corporation, Kariya (JP)

( * ) Notice: Subject to any disclaimer, the term of this patent is extended or adjusted under 35 U.S.C. 154(b) by 672 days.

(21) Appl. No.: 12/150,215

(22) Filed: Apr. 24, 2008

(65) Prior Publication Data
US 2008/0280655 A1 Nov. 13, 2008

(30) Foreign Application Priority Data
Apr. 27, 2007 (JP) ................... 2007-118938

(51) Int. Cl.
*H04M 1/00* (2006.01)
(52) U.S. Cl. .................... 455/569.1; 455/461; 455/41.2; 455/569.2; 455/456.6; 455/557; 340/426.1; 340/425.5; 340/5.61; 701/2; 701/1; 701/36
(58) Field of Classification Search .................. 455/569, 455/414, 575, 450; 379/114, 420, 330, 431; 370/328
See application file for complete search history.

(56) References Cited

U.S. PATENT DOCUMENTS

| 6,526,335 | B1 * | 2/2003 | Treyz et al. ................... 701/1 |
| 7,251,507 | B2 | 7/2007 | Kitao et al. |
| 7,596,636 | B2 * | 9/2009 | Gormley ......................... 710/8 |
| 7,873,345 | B1 * | 1/2011 | Dunne et al. ............. 455/404.1 |
| 7,894,795 | B1 * | 2/2011 | Dunne et al. .............. 455/406 |
| 2002/0142803 | A1 * | 10/2002 | Yamamoto .................. 455/557 |
| 2005/0136949 | A1 * | 6/2005 | Barnes ........................ 455/461 |
| 2006/0154698 | A1 * | 7/2006 | Ogura et al. ............ 455/569.1 |
| 2007/0178944 | A1 | 8/2007 | Mitsuru et al. |
| 2010/0144401 | A1 * | 6/2010 | Azuma ..................... 455/569.2 |
| 2011/0028128 | A1 * | 2/2011 | Cazanas et al. .......... 455/414.1 |

FOREIGN PATENT DOCUMENTS

| JP | 2002-193046 | 7/2002 |
| JP | 2002-223288 | 8/2002 |
| JP | 2004-140731 | 5/2004 |
| JP | 2004-221890 | 8/2004 |
| JP | 2006-109292 | 4/2006 |
| JP | 2007158670 A * | 6/2007 |

OTHER PUBLICATIONS

Office action dated Feb. 10, 2009 in Japanese Application No. 2007 118938.
Instruction Manual FOMA-P903i with partial translation, p. 393, 395.

* cited by examiner

*Primary Examiner* — Nick Corsaro
*Assistant Examiner* — Mahendra Patel
(74) *Attorney, Agent, or Firm* — Harness, Dickey & Pierce, PLC

(57) ABSTRACT

An in-vehicle navigation apparatus performs the following: according to an initial operation of a user to register a handsfree function, connecting a handsfree profile with a cellular phone and registering a handsfree function to be associated with the cellular phone; if the cellular phone has an audio visual function, displaying an audio visual function registration window for querying a user whether to register the audio visual function; and according to an operation of the user to register the audio visual function, connecting an audio visual profile with the cellular phone and registering the audio visual function to be associated with the cellular phone that was registered as being associated with the handsfree function.

10 Claims, 7 Drawing Sheets

FIG. 4A HF FUNCTION REGISTRATION WINDOW

Phone Manager | Back 3 of 4 free

New Phone

Edit Phones

Remove Phones

~5

FIG. 4B HFP CONNECTION STANDBY WINDOW

Connect Bluetooth

Connecting | Cancel

Please connect your phone.
Device Name : ABCDEF
Device Address : 0F112233AABD
Passcode : 1212
Enter the passcode into your phone.

~5

FIG. 4C HFP CONNECTION COMPLETION WINDOW

Connect Bluetooth

Connecting | Cancel

Bluetooth connection successful.

Device Address : 0F112233AABD
Passcode : 1212
Enter the passcode into your phone.

~5

AV FUNCTION REGISTRATION WINDOW

Back

AVP CONNECTION STANDBY WINDOW

AVP CONNECTION COMPLETION WINDOW

IN-VEHICLE APPARATUS

CROSS REFERENCE TO RELATED APPLICATION

This application is based on and incorporates herein by reference Japanese Patent Application No. 2007-118938 filed on Apr. 27, 2007.

FIELD OF THE INVENTION

The present invention relates to an in-vehicle apparatus capable of connecting a function of a portable terminal present in a short range wireless communication area.

BACKGROUND OF THE INVENTION

An in-vehicle navigation apparatus has a Bluetooth (registered trademark) communication function along with a handsfree function. The in-vehicle navigation apparatus connects a handsfree profile (HFP) with a cellular phone having the Bluetooth communication function to thereby register a handsfree function (HF function) and become capable of providing the handsfree function (for instance, refer to Patent document 1).

Further, in recent years, some profiles other than the HFP are put in practical use as a profile connectable between an in-vehicle navigation apparatus and a cellular phone. An audio visual profile (AVP) is an example of such profiles. Conventionally, a user needs to perform a registration operation of a cellular phone for registering each of a HF function and an AV function into an in-vehicle navigation apparatus.

In such a configuration where registration operations of a cellular phone into an in-vehicle navigation apparatus are required individually for multiple functions, even after a registration operation is performed for registering a HF function, another registration operation is again required for registering an AV function. This poses a disadvantage in operability.

Patent Document 1: JP 2002-223288 A

SUMMARY OF THE INVENTION

The present invention is made in view of the above-mentioned situation.

It is an object to provide an in-vehicle apparatus capable of improving operability at the time of registering more than one function provided in a portable terminal.

According to an example of the present invention, an in-vehicle apparatus is provided as follows. A short range wireless communication device is configured to connect, with a portable terminal present within a short range wireless communication area, a communication protocol corresponding to a function included in the portable terminal. An operation reception device is configured to receive a predetermined operation by a user. A query output device is configured to output query information for querying the user whether to register a function. A controller is configured to connect a first communication protocol corresponding to a first function included in the portable terminal between the short range wireless communication device and the portable terminal and to register the first function in association with the portable terminal. Herein, after connecting the first communication protocol between the short range wireless communication device and the portable terminal and registering the first function to be associated with the portable terminal, the controller is configured to determine whether the portable terminal includes a second function different from the first function; when it is determined that the portable terminal includes the second function, the controller is configured to cause the query output device to output query information for querying the user whether to register the second function; and when the operation reception device receives an operation for affirming the registering of the second function, the controller is configured to connect a second protocol corresponding to the second function between the short range wireless communication device and the portable terminal and to register the second function to be associated with the portable terminal, which is registered in association with the first function.

Assume that a user performs a registration operation of, for example, a handsfree function at the beginning. The user connects a handsfree profile with a cellular phone and registers a handsfree function to be associated with the cellular phone. Thereafter, it is determined whether the portable terminal includes another function. When it is determined that the portable terminal has, for example, an audio visual function, query information for asking the user whether to register the audio visual function is outputted. When the user performs a registration operation for registering the audio visual function, the audio visual profile is connected with the portable terminal and the audio visual function is registered to be associated with the portable terminal, which was registered in association with the handsfree function. Thus, on an assumption of a portable terminal having a handsfree function and an audio visual function, when a user registers the handsfree function and the audio visual function, it is not necessary to perform a register operation of the portable terminal for each function. The handsfree function and the audio visual function can be thus continuously registered. The operability at the time of registering more than one function can be improved.

As another example of the present invention, an in-vehicle apparatus is provided as follows. A short range wireless communication device is configured to connect, with a portable terminal present within a short range wireless communication area, a communication protocol corresponding to a function included in the portable terminal. An operation reception device is configured to receive a predetermined operation by a user. A query output device is configured to output query information for querying the user whether to register a function. A controller is configured to connect a first communication protocol corresponding to a first function included in the portable terminal between the short range wireless communication device and the portable terminal and to register the first function in association with the portable terminal. Herein, when connecting the first communication protocol between the short range wireless communication device and the portable terminal and registering the first function to be associated with the portable terminal, the controller is configured to determine whether the portable terminal includes a second function different from the first function; when it is determined that the portable terminal includes the second function, the controller is configured to cause the query output device to output query information for querying the user whether to register the second function; and when the operation reception device receives an operation for affirming the registering of the second function, the controller is configured to connect a second protocol corresponding to the second function between the short range wireless communication device and the portable terminal and to register the second function to be associated with the portable terminal, which is registered in association with the first function.

Similarly, assume that a user performs a registration operation of, for example, a handsfree function at the beginning. The user connects a handsfree profile with a cellular phone and registers a handsfree function to be associated with the cellular phone. At the same time, it is determined whether the portable terminal includes another function. When it is determined that the portable terminal has, for example, an audio visual function, query information for asking the user whether to register the audio visual function is outputted. When the user performs a registration operation for registering the audio visual function, the audio visual profile is connected with the portable terminal and the audio visual function is registered to be associated with the portable terminal, which was registered in association with the handsfree function.

Similarly, on an assumption of a portable terminal having a handsfree function and an audio visual function, when a user registers the handsfree function and the audio visual function, it is not necessary to perform a register operation of the portable terminal for each function. The handsfree function and the audio visual function can be thus continuously registered. The operability at the time of registering more than one function can be improved.

As an optional aspect of the above examples of the in-vehicle apparatuses, when the operation reception device does not receive an operation for affirming the registering of the second function, the controller is configured to neither connect the second protocol between the short range wireless communication device and the portable terminal nor register the second function to be associated with the portable terminal.

For instance, a user performs an initial operation to register a handsfree function, and connects a handsfree profile with a portable terminal and registers a handsfree function to be associated with the portable terminal. Then, according to whether the user performs a registration operation for registering the audio visual function, it can be selected whether to connect the audio visual profile with the portable terminal and register the audio visual function to be associated with the portable terminal.

BRIEF DESCRIPTION OF THE DRAWINGS

The above and other objects, features, and advantages of the present invention will become more apparent from the following detailed description made with reference to the accompanying drawings. In the drawings:

FIGS. 4A to 4F are examples of display windows according to the first embodiment;

DETAILED DESCRIPTION OF THE PREFERRED EMBODIMENTS

First Embodiment

Figure 1:
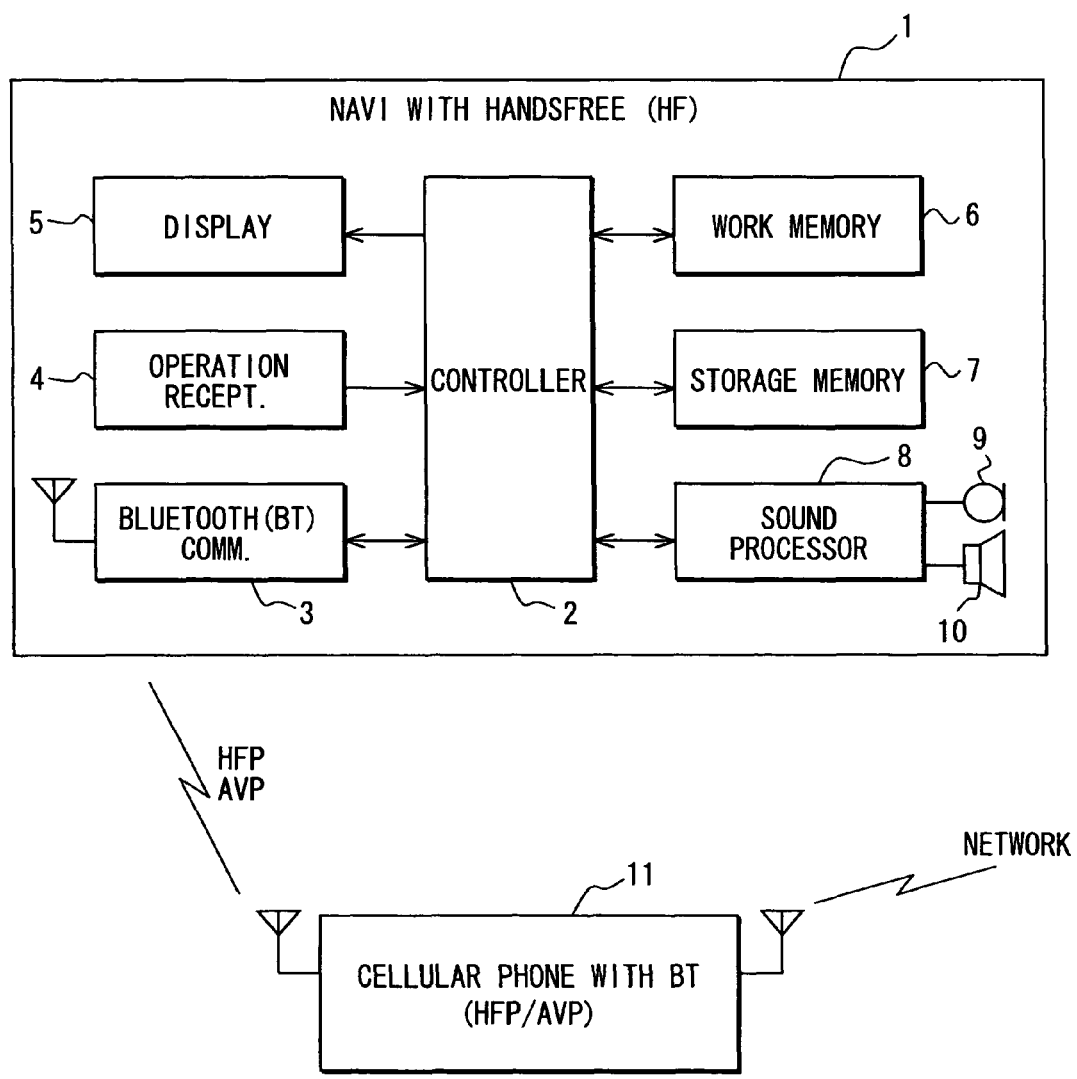
FIG. 1 is a functional block diagram according to a first embodiment of the present invention.
Figure 2:
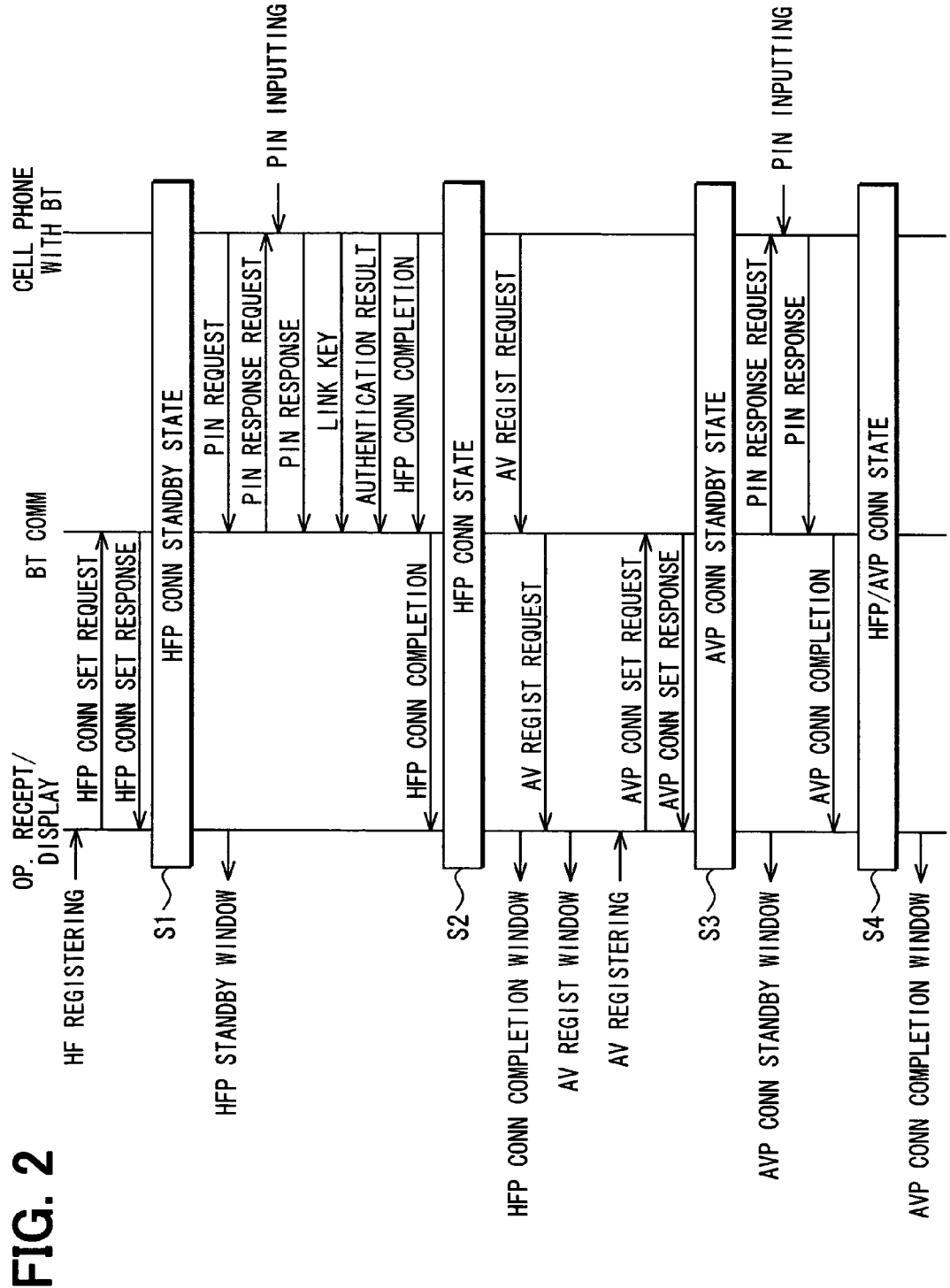
FIG. 2 is a flowchart according to the first embodiment.

The present invention is explained with reference to drawings about a first embodiment applied to an in-vehicle navigation apparatus having a handsfree function and a Bluetooth communication function. FIG. 1 indicates a functional block diagram of an in-vehicle navigation apparatus 1. The in-vehicle navigation apparatus 1 includes the following: a controller 2; a Bluetooth (BT) communication device 3 as a short range wireless communication device; an operation reception device 4; a display device 5 as a query output device; a work memory device 6; a storage memory device 7; a sound processor 8; a microphone 9; and a speaker 10.

The controller 2 controls an overall operation such as communication operation and data control operation of the in-vehicle navigation apparatus 1. The Bluetooth communication device 3 performs communications based on a communication standard of Bluetooth. If a cellular phone 11 as a portable terminal having the Bluetooth communication function exists within a Bluetooth communication area as a short range communication area, the Bluetooth communication device 3 establishes a communication link with the cellular phone 11.

The cellular phone 11 includes several functions such as a function (HF function) corresponding to a handsfree profile (HFP) and a function (AV function) corresponding to an audio visual profile (AVP). Here, a profile can be referred to a communication protocol. The controller 2 connects the HFP between the Bluetooth communication device 3 and the cellular phone 11 and registers the HF function while connecting the AVP between the Bluetooth communication device 3 and the cellular phone 11 and registering the AV function.

The operation reception device 4 detects a user's operation to thereby output a corresponding operation signal to the controller 2. The display device 5 displays a display window based on a display signal inputted from the controller 2. The work memory device 6 is non-volatile memory and stores data transmitted from the cellular phone 11. For instance, the data include telephone book data, transmission record data, and reception record data. The storage memory device 7 is nonvolatile memory and stores, for instance, data transmitted from the cellular phone 11. In such a case, the controller 2 manages storage operation of data in the work memory device 6 or the storage memory device 7. For example, when the user demands a display of data via the operation reception device 4, the data stored in the work memory device 6 or storage memory device 7 is displayed on the display device 5.

The sound processor 8 performs sound-processing for transmit sounds inputted via the microphone 9 or receive sounds outputted via the speaker 10. When connecting the HFP between the Bluetooth communication device 3 and the cellular phone 11 and performing a handsfree telephone call, the controller 2 transmits sounds inputted via the microphone 9, to a cellular phone network via the Bluetooth communication device 3 and the cellular phone 11. At the same time, the controller 2 outputs, to the speaker 10, sounds received from the cellular phone network via the cellular phone 11 and the Bluetooth communication device 3.

In addition, the navigation apparatus 1 includes the following: a present position detector to detect a present position of the vehicle; a route retrieval unit to retrieve a route from a present position to a destination; a map data reading device to read map data in a storage medium; a VICS (Vehicle Information and Communication System) receiver to receive VICS information distributed from the VICS (registered trademark) center; and a speech recognition device to recognize speeches pronounced or uttered by a user.

In addition, the navigation apparatus 1 is configured to start or stop in association with ON or OFF of an ACC (Accessory) switch, respectively. For example, according to a user's operation, the ACC switch changes from ON to OFF to thereby stop power supply. In such a case, although the data stored in the storage memory device 7 is held without being deleted, the data stored in the work memory device 6 is deleted or disappears.

An operation under the above configuration of the in-vehicle navigation apparatus 1 is explained with reference to FIGS. 2, 3, and 4A to 4F. Here, it is assumed that the cellular phone 11 brought in the vehicle is able to communicate with the in-vehicle navigation apparatus 1 using the Bluetooth communication. Further, it is also assumed that the HFP and AVP are simultaneously connected between the cellular phone 11 and the Bluetooth communication device 3. This is referred to as multiple profile connection.

It is assumed that in the in-vehicle navigation apparatus 1, a HF function registration window is displayed in the display device 5, as shown in FIG. 4A. According to a use's operation of pressing "New Phone," the controller 2 receives a signal of registration operation for registering the HF function via the operation reception device 4 to thereby output the "HFP connection mode setting request" to the Bluetooth communication device 3. Subsequently, when the "HFP connection mode setting response" is inputted from the Bluetooth communication device 3, the controller 2 connects the HFP between the Bluetooth communication device 3 and the cellular phone 11. The controller 2 proceeds to the HFP connection standby state along with the cellular phone 11 at S1 in FIG. 2, and causes the display device 5 to display the HFP connection standby window (refer to FIG. 4B).

After proceeding to the HFP connection standby state, the controller 2 receives "PIN request" from the cellular phone 11 via the Bluetooth communication device 3. The controller 2 then transmits "PIN response request" to the cellular phone 11 via the Bluetooth communication device 3. Thus, the controller 2 waits a user's operation for inputting PIN (Personal Identification Number) via the cellular phone 11. Here, the user operates the cellular phone 11 and inputs PIN. When receiving from the cellular phone 11 "PIN response," "Link key," "Authentication result," and "HFP connection completion" in this order, the Bluetooth communication device 3 inputs "HFP connection completion" to the controller 2. The controller 2 proceeds to the HFP connection state along with the cellular phone 11 at S2 in FIG. 2, and causes the display device 5 to display the HFP connection completion window (refer to FIG. 4C). The user can thus check the HFP connection completion window to thereby confirm that the in-vehicle navigation apparatus 1 has connected the HFP with the cellular phone 11, and the HF function is registered.

When proceeding to the HFP connection standby state, the cellular phone 11 transmits "AV function registration request" to the Bluetooth communication device 3. When "AV function registration request" is inputted from the cellular phone 11, the Bluetooth communication device 3 inputs "AV function registration request" to the controller 2. The controller 2 causes the display device 5 to display the AV function registration window (refer to FIG. 4D) as the query information. In such a case, the user selects or determines whether to register the AV function.

According to a use's operation of pressing "Yes" corresponding to affirming the AV registration operation, the controller 2 receives a signal of registration operation for registering the AV function via the operation reception device 4 to thereby output the "AVP connection mode setting request" to the Bluetooth communication device 3. Subsequently, when receiving the "AVP connection mode setting response" from the Bluetooth communication device 3, the controller 2 proceeds to the AVP connection standby state along with the cellular phone 11 at S3 in FIG. 2, and causes the display device 5 to display the AVP connection standby window (refer to FIG. 4E).

Subsequently, the controller 2 transmits the "PIN response request" to the cellular phone 11 from the Bluetooth communication device 3, and waits the user's input of the PIN via the cellular phone 11. When the user operates the cellular phone 11 to thereby input the PIN, the Bluetooth communication device 3 receives the "PIN response" to thereby transmit the "AVP connection completion" to the controller 2. The controller 2 then proceeds to the HFP/AVP connection state along with the cellular phone 11 at S4 in FIG. 2, and registers the AV function to be associated with the cellular phone 11, which is registered in association with the HF function. The controller 2 then causes the display device 5 to display the AVP connection completion window (refer to FIG. 4F). The user can thus check the AVP connection completion window to thereby confirm that the in-vehicle navigation apparatus 1 has connected the AVP with the cellular phone 11, and the AV function is registered.

Figure 3:
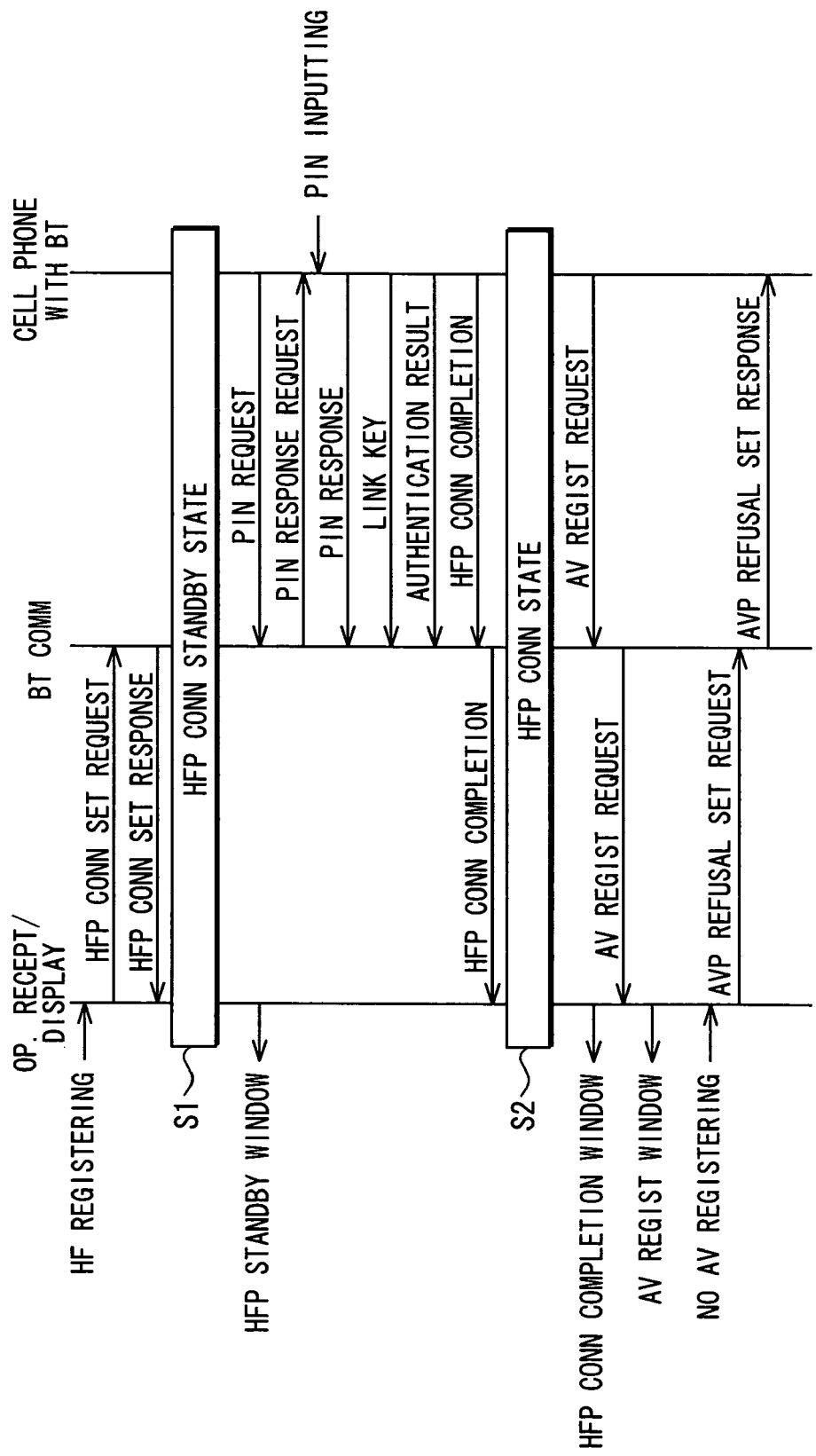
FIG. 3 is another flowchart according to the first embodiment.
Figure 4D:
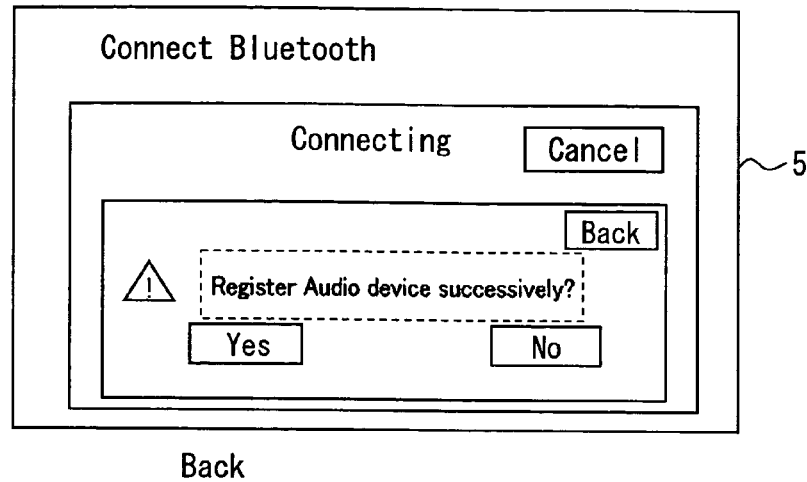
Figure 4E:
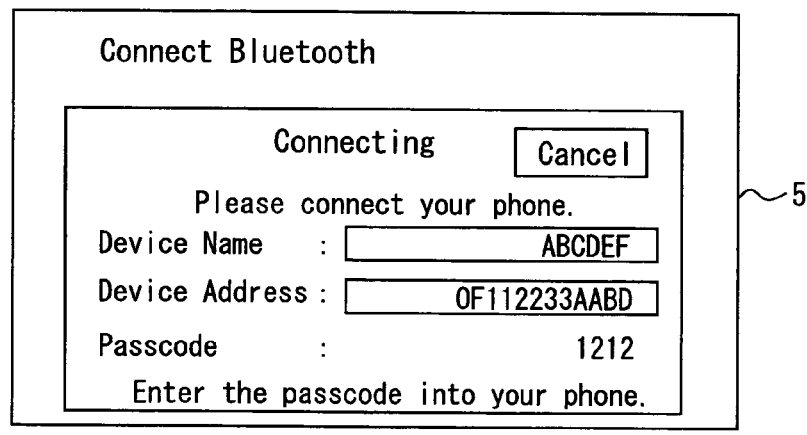
Figure 4F:
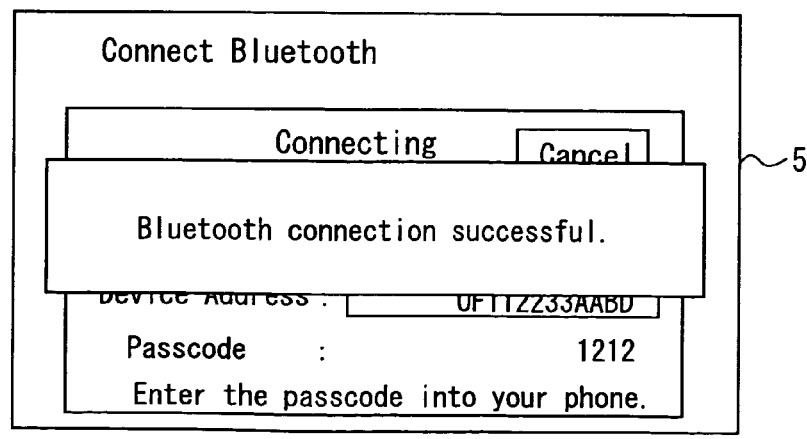

In contrast, according to a use's operation of pressing "No" corresponding to negating the AV registration operation, the controller 2 receives no registration operation for registering the AV function via the operation reception device 4. As illustrated in FIG. 3, the controller 2 outputs the "AVP refusal mode setting request" to the cellular phone 11 via the Bluetooth communication device 3 without proceeding to the AVP connection standby state.

As explained above, after the in-vehicle navigation apparatus 1 connected the HFP with the cellular phone 11 and registers the HF function, a user presses either "Yes" key or "No" key in the AV function registration window to thereby select whether the AVP is connected between the Bluetooth communication device 3 and the cellular phone 11 after having registered the HF function.

Further, the above takes place on the assumption that the HFP and AVP are simultaneously connected between the cellular phone 11 and the Bluetooth communication device 3. In contrast, if the Bluetooth communication device 3 and the cellular phone 11 cannot connect the HFP and AVP at the same time, the AVP is connected after the connection of the HFP which is previously connected is disconnected. Displaying the AV function registration window is not limited to be appearing after the in-vehicle navigation apparatus 1 connects the HFP with the cellular phone 11 and registers the HF function. When the in-vehicle navigation apparatus 1 connects the HFP with the cellular phone 11 and registers the HF function, the AV function registration window can be displayed. Similarly, the user presses either "Yes" key or "No" key in the AV function registration window to thereby select whether to register the AV function after having registered the HF function.

As explained above, the in-vehicle navigation apparatus 1 according to the first embodiment operates as follows. According to an initial operation of a user to register a handsfree (HF) function, a handsfree profile (HFP) is connected with the cellular phone 11, and the handsfree function is registered to be associated with the cellular phone 11. When the cellular phone 11 has an audio visual (AV) function, an audio visual function registration window is displayed for asking a user whether to register the audio visual function. According to the user's registration operation, the audio visual profile is connected with the cellular phone 11, and the audio visual function is registered while being associating with the cellular phone 11 that has been registered in association with the handsfree function. Thus, when a user registers a handsfree (HF) function and an audio visual (AV) function, it is not necessary to perform a registration operation of the portable terminal for each function. These HF function and AV function can be continuously registered. The operability at the time of registering the HF function and the AV function can be improved.

Second Embodiment

Figure 5:
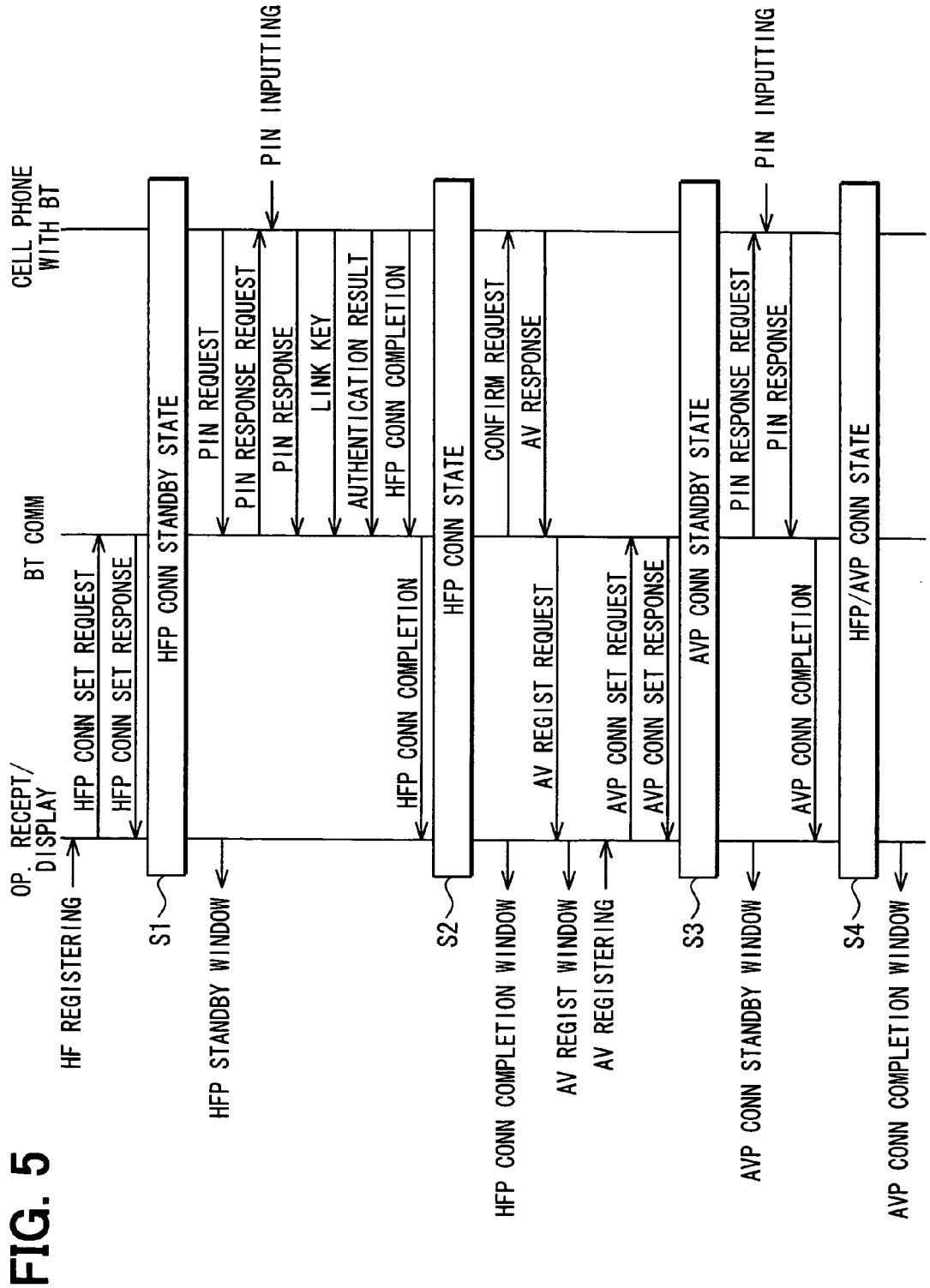
FIG. 5 is a flowchart according to a second embodiment of the present invention.
Figure 6:
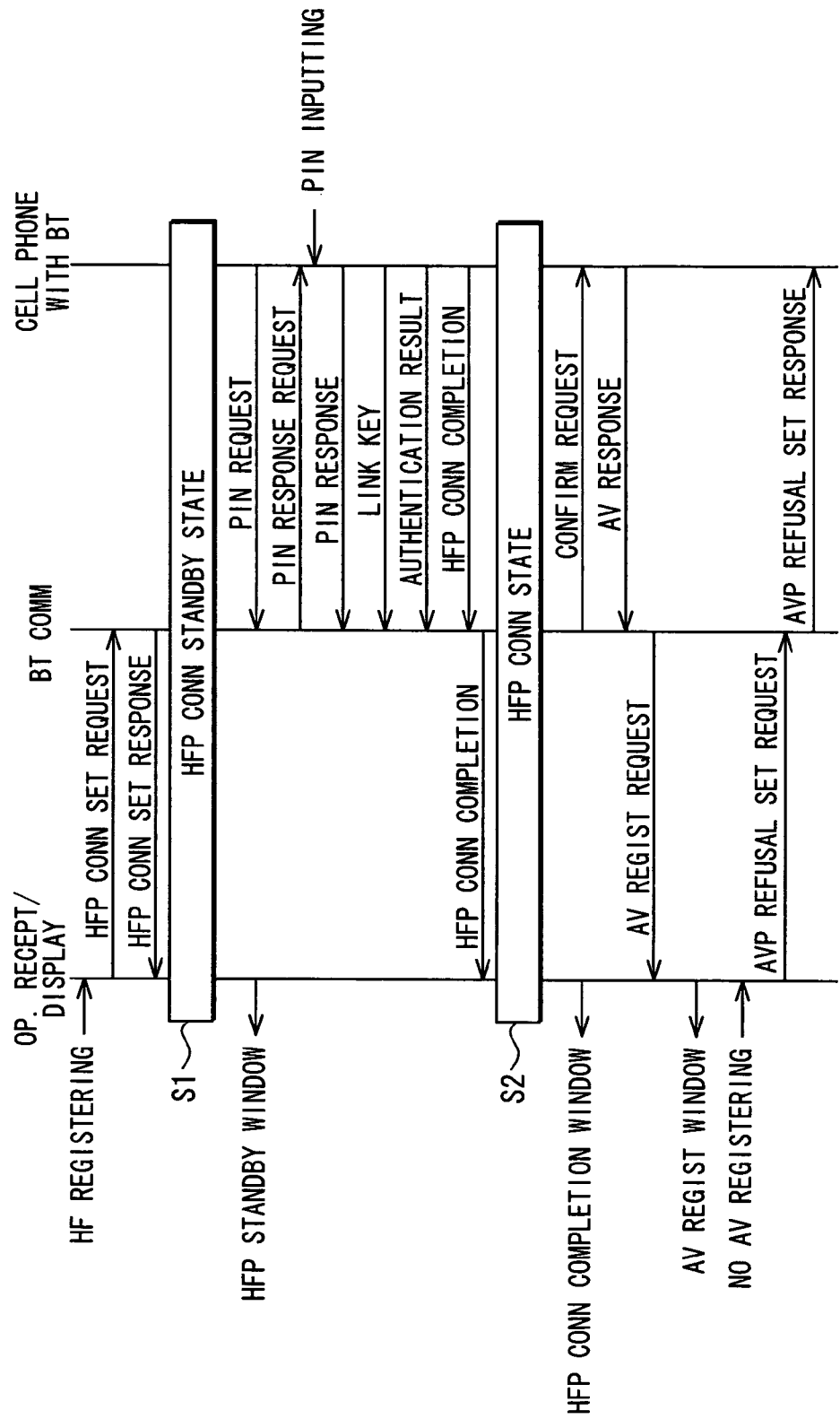
FIG. 6 is another flowchart according to the second embodiment.

A second embodiment according to the present invention is explained with reference to FIGS. 5, 6. Herein, explanation is omitted for the same parts as those in the first embodiment and made for the different parts from the first embodiment. In the first embodiment, after proceeding to the HFP connection state, the cellular phone 11 spontaneously transmits the "AV function registration request" to the Bluetooth communication device 3. In contrast, in the second embodiment, after proceeding to the HFP connection state, the cellular phone 11 does not spontaneously transmit the "AV function registration request" to the Bluetooth communication device 3.

That is, after proceeding to the HFP connection state, the cellular phone 11 stands by until a predetermined time period passes without transmitting the "AV function registration request" to the Bluetooth communication device 3. When proceeding to the HFP connection state along with the cellular phone 11 at S2 in FIG. 5, the controller 2 registers the HF function to be associated with the cellular phone 11 and displays the HFP connection completion window on the display device 5. Here, at the same time, the controller 2 transmits the "function confirmation request" to the cellular phone 11 via the Bluetooth communication device 3. The controller 2 receives "function response" indicating another function (AV function in the second embodiment) included in the cellular phone 11 from the cellular phone 11 via the Bluetooth communication device 3.

As explained in the first embodiment, when the "AV function registration request" is inputted from the Bluetooth communication device 3, the AV function registration window appears on the display device 5. The same process as explained in the first embodiment is executed thereafter. That is, according to a use's operation of pressing "Yes" corresponding to affirming the AV registration operation, the controller 2 receives a signal of registration operation for registering the AV function via the operation reception device 4. As illustrated in FIG. 5, the controller 2 proceeds to the AVP connection standby state at S3 in FIG. 5. In contrast, according to a use's operation of pressing "No," the controller 2 receives no registration operation for registering the AV function via the operation reception device 4. As illustrated in FIG. 6, the controller 2 does not proceed to the AVP connection standby state.

As explained above, according to the second embodiment, the same advantage as that of the first embodiment can be obtained.

Other Embodiments

The present invention is not limited only to the above-mentioned embodiments, and can be modified or extended as follows. Other profiles can be connected between the in-vehicle navigation apparatus 1 and the cellular phone 11. For instance, an object push profile (OPP), a phone book access profile (PBAP) may be included.

The portable terminal may be a personal digital assistant (PDA) with a telephone function. The in-vehicle handsfree device having the Bluetooth communication function may be substituted for the in-vehicle navigation apparatus 1 having the handsfree function along with the Bluetooth communication function. Further, the in-vehicle navigation apparatus 1 may be a portable type. The query information for asking whether to register the AV function may be performed not via the display window on the display device 5 but via audio guidance using the speaker 10.

Further, the query information for asking whether to register the AV function may be performed not only via the display window on the display device 5 but also via the audio guidance using the speaker 10.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. An in-vehicle apparatus, comprising:
  a short range wireless communication device connecting a protocol, with a portable terminal present within a short range wireless communication area;
  an operation reception device receiving a predetermined operation from a user;
  a query output device outputting query information for querying the user whether to register a function; and
  a controller
  establishing a connection standby state between the short range wireless communication device and the portable terminal for connecting protocols corresponding to functions included in the portable terminal to thereby register the functions in association with the portable terminal, respectively, and
  establishing, after registering the functions, a connection state of the protocols corresponding to the functions, respectively,
  wherein:
  after establishing the connection standby state between the short range wireless communication device and the portable terminal and then registering a first protocol corresponding to a first function in association with the portable terminal,
  the controller determines whether the portable terminal includes a second function different from the first function;
  when it is determined that the portable terminal includes the second function,
  the controller causes the query output device to output query information for querying the user whether to register the second function; and
  when the operation reception device receives an operation for affirming the registering of the second function,
  the controller
  registers the second function in association with the portable terminal, which is registered in association with the first function to connect a second protocol corresponding to the second function between the short range wireless communication device and the portable terminal.

2. An in-vehicle apparatus, comprising:
  a short range wireless communication device connecting a protocol, with a portable terminal present within a short range wireless communication area;
  an operation reception device receiving a predetermined operation from a user;

a query output device outputting query information for querying the user whether to register a function; and a controller establishing a connection standby state between the short range wireless communication device and the portable terminal for connecting protocols corresponding to functions included in the portable terminal to thereby register the functions in association with the portable terminal, respectively, and establishing, after registering the functions, a connection state of the protocol corresponding to the functions, respectively, wherein:

when registering a first protocol corresponding to a first function in association with the portable terminal after establishing the connection standby state between the short range wireless communication device and the portable terminal, the controller determines whether the portable terminal includes a second function different from the first function;

when it is determined that the portable terminal includes the second function, the controller causes the query output device to output query information for querying the user whether to register the second function; and when the operation reception device receives an operation for affirming the registering of the second function, the controller registers the first function and the second function in association with the portable terminal to connect the first protocol corresponding to the first function and a second protocol corresponding to the second function between the short range wireless communication device and the portable terminal.

3. The in-vehicle apparatus according to claim 1, wherein when the operation reception device does not receive an operation for affirming the registering of the second function, the controller neither registers the second function in association with the portable terminal nor connects the second protocol between the short range wireless communication device and the portable terminal.

4. The in-vehicle apparatus according to claim 2, wherein when the operation reception device does not receive an operation for affirming the registering of the second function, the controller neither registers the second function to be associated with the portable terminal nor connects the second protocol between the short range wireless communication device and the portable terminal.

5. An in-vehicle apparatus, comprising:

a short range wireless communication device connecting protocols with a portable terminal present within a short range wireless communication area;

an operation reception device receiving a predetermined operation from a user;

a query output device outputting query information for querying the user whether to register functions; and a controller establishing a connection standby state between the short range wireless communication device and the portable terminal for connecting a first protocol corresponding to a first function included in the portable terminal to thereby register the first function in association with the portable terminal, and establishing, after registering the first function, a connection state of the first protocol, wherein:

after establishing a connection standby state between the short range wireless communication device and the portable terminal for connecting the first protocol corresponding to the first function included in the portable terminal and registering the first function in association with the portable terminal, the controller determines whether the portable terminal includes a second function different from the first function;

when it is determined that the portable terminal includes the second function, the controller causes the query output device to output query information for querying the user whether to register the second function; and when the operation reception device receives an operation for affirming the registering of the second function, the controller registers the second function in association with the portable terminal, which was registered in association with the first function, and connects a second protocol corresponding to the second function between the short range wireless communication device and the portable terminal.

6. An in-vehicle apparatus, comprising:

a short range wireless communication device connecting protocols with a portable terminal present within a short range wireless communication area; and a controller establishing a connection standby state between the short range wireless communication device and the portable terminal for connecting a first protocol corresponding to a first function included in the portable terminal to thereby register the first function in association with the portable terminal, and establishing, after registering the first function, a connection state Of the first protocol, wherein:

after establishing a connection standby state between the short range wireless communication device and the portable terminal for connecting the first protocol corresponding to the first function included in the portable terminal and registering the first function in association with the portable terminal, the controller determines whether the portable terminal includes a second function different from the first function; and when it is determined that the portable terminal includes the second function, the controller registers the second function in association with the portable terminal, which was registered in association with the first function, and connects a second protocol corresponding to the second function between the short range wireless communication device and the portable terminal.

7. The in-vehicle apparatus according to claim 5, wherein when the operation reception device does not receive an operation for affirming the registering of the second function, the controller neither registers the second function in association with the portable terminal, nor connects the second protocol between the short range wireless communication device and the portable.

8. The in-vehicle apparatus according to claim 6, wherein the controller determines whether the portable terminal includes the second function different from the first function by determining whether to receive a registration request to register the second function from the portable terminal.

9. A method for connecting a portable terminal to an in-vehicle apparatus, the method comprising:

connecting a short range wireless communication device with the portable terminal using a protocol;
receiving a predetermined operation from a user using an operation reception device;
outputting query information from a query output device for querying the user whether to register a function;
establishing a connection standby state between the short range wireless communication device and the portable terminal for connecting protocols corresponding to functions included in the portable terminal to thereby register the functions in association with the portable terminal, respectively,
establishing, after registering the functions, a connection state of the protocols corresponding to the functions, respectively,
establishing the connection standby state between the short range wireless communication device and the portable terminal;
registering a first protocol corresponding to a first function in association with the portable terminal;
determining if the portable terminal includes a second function different than the first function;
causing the query output device to output query information for querying the user whether to register the second function;
receiving an operation affirming the registering of the second function; and
registering the second function in association with the portable terminal.

10. A method for an in-vehicle apparatus to connect a portable terminal,
the in-vehicle apparatus including:
a short range wireless communication device configured to connect protocols with the portable terminal present within a short range wireless communication area;
an operation reception device configured to receive a predetermined operation from a user; and
a query output device configured to output query information for querying the user,
the method comprising:
establishing a connection standby state between the short range wireless communication device and the portable terminal for connecting a first protocol corresponding to a first function included in the portable terminal;
registering the first function in association with the portable terminal;
determining, after registering the first function, whether the portable terminal includes a second function different from the first function;
causing the query output device to output query information for querying the user whether to register the second function, when determining that the portable terminal includes the second function;
registering the second function in association with the portable terminal, which was registered in association with the first function, when the operation reception device receives an operation for affirming the registering of the second function; and
connecting a second protocol corresponding to the second function between the short range wireless communication device and the portable terminal.

* * * * *